Patented Apr. 18, 1950

2,504,612

UNITED STATES PATENT OFFICE 2,504,612

PODOCARPINOL

Harold H. Zeiss, Tenafly, N. J., assignor, by mesne assignments, to Pierce Laboratory, Inc., New York, N. Y., a corporation of New York No Drawing. Application January 21, 1948, Serial No. 3,557

1 Claim. (Cl. 260—618)

This invention relates to a new compound, namely, podocarpinol, and to a method for preparing podocarpinol.

The new compound of the present invention has a structural formula as indicated just below:

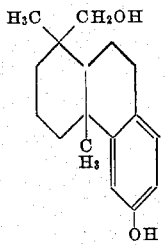

Various other derivatives have been prepared from podocarpic acid. Thus, in the Journal of the British Chemical Society, 1006 (1938), Sherwood and Short have described the preparation of methylpodocarpate, methyl O-methylpodocarpate, and O-methylpodocarpic acid. In the J. Amer. Chem. Soc., 64, 928 (1942) Campbell and Todd have described the preparation of O-methylpodocarpoyl chloride from O-methylpodocarpic acid, and the subsequent preparation of O-methylpodocarpinol through O-methylpodocarpinal.

The present invention contemplates preparation of podocarpinol from O-methylpodocarpinol, the latter having the following structure:

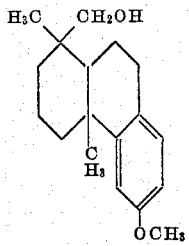

According to the present invention the known compound O-methylpodocarpinol is demethylated, as by reaction of O-methylpodocarpinol in acetic acid solution with a halogen acid, such as hydrochloric acid, hydrobromic acid or hydriodic acid. The reaction mixture is refluxed for a time upwards of six hours, say from six to ten hours. This reaction produces podocarpinol.

Example 4 g. of O-methylpodocarpinol was dissolved in 225 ml. of glacial acetic acid, followed by the addition of 110 ml. of concentrated hydrochloric acid and 25 ml. of water. This solution was refluxed for ten hours and then concentrated to one-half its volume under vacuum. The addition of 500 ml. of water caused an oil to separate which was removed and dissolved in ether. The ether solution was then extracted with 1% aqueous sodium hydroxide to remove the desired product, podocarpinol. Acidification of the alkaline solution with dilute sulfuric acid gave an oil which was taken up in ether. After washing the ether solution with water and then drying over anhydrous sodium sulfate, the ether was concentrated and hexane added. On standing 0.01 g. of crude podocarpinol crystallized out of solution; M. P. 174–178° C. Recrystallization from ether gave podocarpinol melting at 176–178° C.

It may be mentioned that podocarpinol may also be produced by reaction of podocarpic acid with lithium aluminum hydride, as disclosed in the copending application, Serial No. 3,556, of the present applicant and one Chester E. Slimowicz, filed concurrently herewith. It is further pointed out that a mixed melting point made with the product of the example given above and with podocarpinol prepared according to said copending application showed no depression. It is still further mentioned that podocarpinol produced according to the method of said copending application gave, upon methylation, O-methylpodocarpinol which produced no depression upon the making of a mixed melting point with a known sample of O-methylpodocarpinol.

Note further that the reduction method disclosed in said copending application may be utilized in the preparation of O-methylpodocarpinol, from which podocarpinol may be prepared by demethylation, according to the method herein disclosed.

I claim:

Podocarpinol.

HAROLD H. ZEISS.

REFERENCES CITED

The following references are of record in the file of this patent:

Campbell et al.: Jour. Am. Chem. Soc., vol. 64, pages 928–933 (1942).

Fieser et al.: Organic Chemistry, pub. by D. C. Heath & Co., Boston (1944), pages 142 and 636.

Karrer: Organic Chemistry, 3rd ed., pub. by Elsevier Pub. Co., Inc., N. Y. (1947) page 419.